United States Patent [19]

Wilson

[11] Patent Number: 4,863,329
[45] Date of Patent: Sep. 5, 1989

[54] RESILIENTLY CLAMPED SUPPORT

[75] Inventor: Gregory S. Wilson, Tequesta, Fla.

[73] Assignee: United Technologies Corporation, Hartford, Conn.

[21] Appl. No.: 150,347

[22] Filed: Jan. 29, 1988

[51] Int. Cl.$^4$ ............................................. F16B 21/00
[52] U.S. Cl. ................................... 411/339; 411/367;
411/383; 411/544; 248/635; 403/371
[58] Field of Search ................ 411/339, 338, 367–370,
411/107, 544, 10–11, 163, 186, 383; 248/635,
580, 603; 403/371, 408.1

[56] References Cited

U.S. PATENT DOCUMENTS

| | | | |
|---|---|---|---|
| 625,203 | 5/1899 | Wiont | 411/338 |
| 1,578,667 | 3/1926 | Kelsay | 411/338 X |
| 2,115,653 | 4/1938 | Snyder | 248/635 |
| 2,700,172 | 1/1955 | Rohe | 411/338 X |
| 3,008,552 | 11/1961 | Cushman et al. | 411/339 X |
| 3,032,089 | 5/1962 | Gutshall | 411/163 X |
| 3,156,281 | 11/1964 | Demi | 411/107 X |
| 3,556,570 | 1/1971 | Cosenza | 411/544 X |
| 3,771,410 | 11/1973 | Swindt, II | 411/338 |
| 4,257,465 | 3/1981 | Berg | 411/163 X |
| 4,490,083 | 12/1984 | Rebish | 411/338 |
| 4,783,039 | 11/1988 | Peterson et al. | 248/635 |

FOREIGN PATENT DOCUMENTS 285030 8/1928 United Kingdom ................ 411/544

Primary Examiner—Gary L. Smith
Assistant Examiner—Douglas E. Ringel
Attorney, Agent, or Firm—Edward L. Kochey, Jr.

[57] ABSTRACT

A structure 10 is resiliently clamped and supported on stud 12. A cylindrical core 38 of the spring sleeve is compressed by nut 34 against a stop 32. The supported structure is biased against the stop 32 by a plurality of spring fingers 40 located at the lower end of the core.

7 Claims, 1 Drawing Sheet

RESILIENTLY CLAMPED SUPPORT

RESILIENTLY CLAMPED SUPPORT

The Government has rights in this invention pursuant to a contract awarded by the Department of the Air Force.

TECHNICAL FIELD

The invention relates to support apparatus and in particular to an apparatus for resiliently engaging the supported structure.

BACKGROUND OF THE INVENTION

In aircraft engines there is a need to support a gear case from an intermediate housing. The structure is subject to engine vibration, miscellaneous acceleration (g) forces and differential thermal expansion.

Transverse thermal expansion between support locations must be accepted by sliding of the support to avoid locked in thermal stress. The support must be clamped softly enough to allow this, but clamped firmly enough to be able to resist excessive vibration and fretting corrosion by means of frictional dampening.

Prior art loose fit or linkage connections did not accomplish these objectives.

SUMMARY OF THE INVENTION

A support stud threaded into the supporting apparatus has an upper stop between the ends with a threaded support portion extending downwardly. A flanged spring sleeve including a hollow cylindrical core surrounds the support portion with a nut located therebelow compressing the core against the stop. The upper surface of the structure to be supported also abuts the stop while the sleeve has a plurality of radially extending resilient fingers abutting the lower surface of the structure to be supported.

The core of the sleeve is thereby compressed between the nut and the stop with the resilient fingers located on the cylindrical core deflecting in accordance with the design dimensions to support the structure with a predetermined force.

DESCRIPTION OF THE PREFERRED EMBODIMENT

Figure 3:
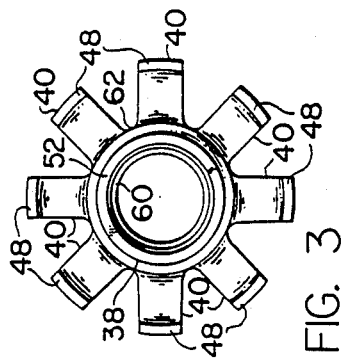
FIG. 3 is a bottom view of a flanged spring sleeve.
Figure 4:
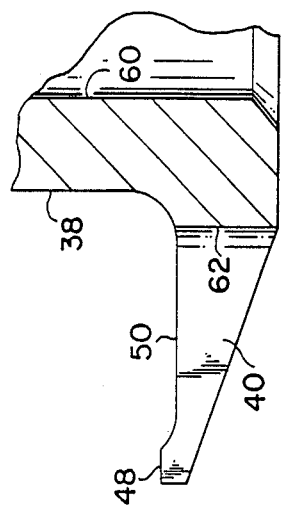
FIG. 4 is a an elevation view of a spring finger.

A gearbox case 10 is supported from an intermediate casing, not shown, on a three point support by support studs 12, 14 and 16. An internally splined gearshaft 17 schematically shown with piloting cover plate 18 has an externally splined tower shaft 20 engaging therein. During operation this power shaft interface operates as a zero expansion point with the gearbox case 10 expanding relative to the engine intermediate casing, resulting in differential horizontal growth at the stud support locations.

Figure 2:
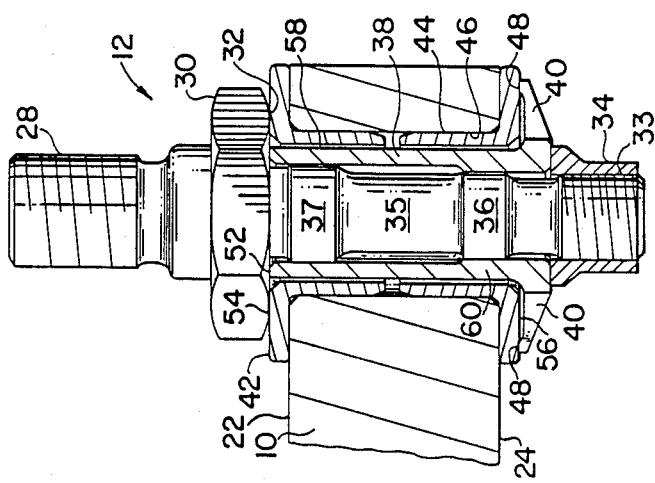
FIG. 2 is a section through a support.
Figure 1:
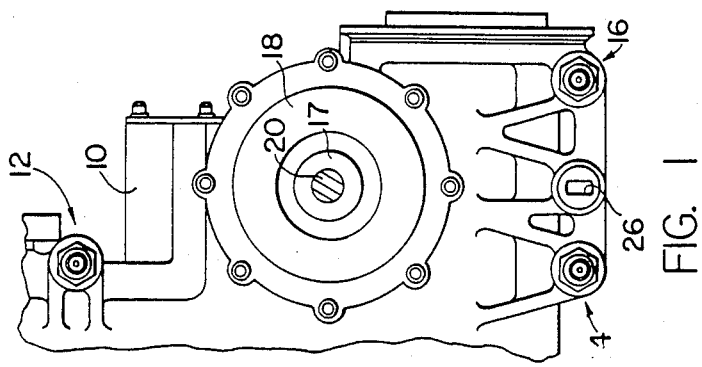
FIG. 1 is a plan view of the gearbox support arrangement.

FIG. 2 illustrates a section through support stud 12 where the gearbox case has a planar section with an upper surface 22 and a lower surface 24. The other stud locations are substantially identical to this.

A torque pin slot 26 is located in an opening which is radially slotted with respect to the center of shaft 20 for the purpose of interfacing with a pin to resist torque.

An upper threaded portion 28 of stud 12 is fastened within an intermediate housing or any other structure from which a device is to be supported. Located on the stud between the ends is a hexagonal section 30 utilized to tighten the upper threaded portion, which has lower surface 32 operating as an upper stop. The stud has a threaded portion 33 extending downwardly therefrom for purposes of receiving a conventional self-locking nut 34. The central portion 35 of the stud below the stop is unthreaded with cylindrical bearing shoulders 36 and 37 thereon. A spring sleeve comprised of a hollow cylindrical core 38 and carrying a plurality of radially outwardly extending fingers 40 is compressed between nut 34 and the stop 32.

The gearbox case 10 being of aluminum for purposes of achieving lightweight has a poor resistance to wear, and accordingly an upper flanged bushing 42 and a lower flanged bushing 44 may optionally be placed within opening 46 in structure 10. An annular clearance 58 exists between the outside of cylindrical section 38 and the inside of each bushing to permit horizontal growth of structure 10 when differential expansion occurs. The support may be used with or without these press fitted bushings and accordingly the stainless steel bushings may be considered an integral part of the structure being supported.

As seen in FIG. 3 there are eight separate and distinct fingers integral with the cylindrical portion of the spring sleeve. Each extends radially outwardly with a foot 48 located at the outer edge and a recessed portion 50 between the cylinder 38 and the foot. Only the foot bears against the lower surface of structure 10, with recessed portion 50 remaining clear except under extraordinary loading conditions. During impact loading as in landing, the fingers fully deflect and some load is carried within the recessed portion. The fingers thereby absorb some of the dynamic loading.

The finger is triangular in shape with decreasing thickness at radially increasing diameter, whereby on deflection of the finger a substantially equal bending moment stress occurs throughout the length of the finger. The finger may be tapered in beam also, decreasing in width at radially increasing diameter, to achieve increased deflection capability.

It can be seen that the relaxed position of the finger, and in particular, foot 48 of each finger, is established by the distance in the spring sleeve between the upper surface 52 which abuts stop 32 and the foot 48 itself. Similarly, a preestablished distance exists between the upper surface 54 of the supported structure and the lower surface 56. By establishing a preselected difference between the two dimensions a preselected deflection of the spring fingers is established, and knowing the spring constant, the preloading force is determined. The fingers cannot be overstresssed when tightening the nut within its specified range since it is the stiffer cylindrical core itself which also resists nut compression loads. Accordingly, a preselected force is established supporting the gear casing 10 which is sufficient to support the load without undue vibration but clamped lightly enough to permit relative transverse thermal expansion between the gearbox 10 and each of the support studs 12. Appropriate clearance 58 is provided for this purpose.

In selecting the spring constant which establishes the required deflection for a given load, consideration should also be given to the resulting natural frequency. Any forcing frequency of the engine should be avoided.

The root 62 between the fingers is on a diameter greater than that of the cylindrical core of the sleeve. This diameter is also greater than the inside diameter of the bushings. Should all fingers of a sleeve fail, the gearbox case will still be supported on the ridge formed at the diameter of the roots.

A thickened portion 60 of the core is located adjacent to the spring fingers to minimize the combined stresses at that location.

In the illustrative embodiment a 170 pound gearbox case is being supported. The core has a 0.70 inch diameter and the fingers a 1.40 inch outside diameter. At the root of the spring fingers the diameter is 0.76 inches. A 0.04 inch foot on each finger follows a 0.30 inch deep recess. Deflection of each finger when installed is 0.0105 inches resulting in a maximum preload force of 1312 pounds from each of the three supports. The sleeve is preferably of a titanium alloy because of the low modulus of elasticity combined with a high yield strength.

I claim:

1. A resiliently clamped support for a structure, said structure including a planar section having a predetermined thickness and a vertical opening therethrough:
   a support stud;
   an upper stop located on said stud with a support portion of said stud extending down therebelow including a threaded portion at the lower end;
   a spring sleeve including a hollow cylindrical core surrounding said support portion and rigidly abutting said upper stop;
   a lower nut secured to said support portion and rigidly abutting said cylindrical core, thereby compressing said core between said nut and said stop;
   said planar section having one of an upper and lower metal surface abutting one of said upper stop and said nut, and said support portion of said support stud passing through the vertical opening; and
   said spring sleeve also including a plurality of radially extending fingers on one end of said core resiliently biased against the other metal surface of said planar section.

2. A support as in claim 1:
   said fingers located at the lower end of said core and biased against the lower surface of said planar portion.

3. A support as in claim 1:
   each of said fingers having a maximum thickness adjacent to said cylinder and the thickness radially decreasing uniformly therefrom.

4. A support as in claim 1:
   said plurality of fingers being at least four fingers.

5. A support as in claim 4:
   each of said fingers having a maximum thickness adjacent to said cylinder and radially decreasing uniformly in thickness therefrom.

6. A support as in claim 4:
   said opening having an inside diameter;
   said spring sleeve including
   a plurality of roots between adjacent fingers; and
   the diameter of the root locations being greater than said inside diameter.

7. A resiliently clamped support for a structure, said structure including a planar section having a predetermined thickness and a vertical opening therethrough;
   a support stud;
   an upper stop located on said stud with a support portion of said stud extending down therefrom, including a threaded portion at the lower end;
   a spring sleeve including a hollow cylindrical core surrounding said support portion and rigidly abutting said upper stop;
   a lower nut secured to said support portion and rigidly abutting said cylindrical core, thereby compressing said core between said nut and said stop;
   said planar section having an upper surface abutting said upper stop, and said support portion of said support stud passing through the vertical opening; and
   said spring sleeve also including a plurality of radially extending fingers at a lower end of said core, each of said fingers having a foot with a planar surface parallel to and resiliently biased against a lower surface of said planar section.

* * * * *